UNITED STATES PATENT OFFICE.

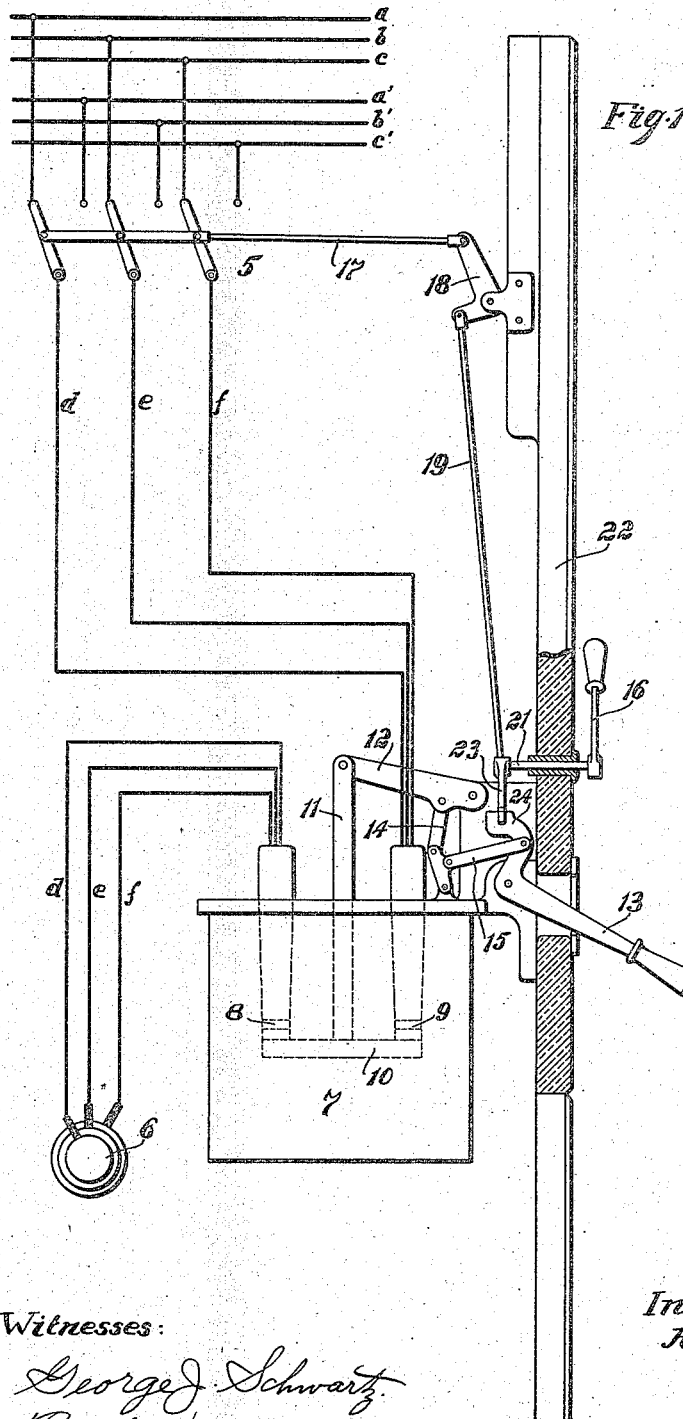
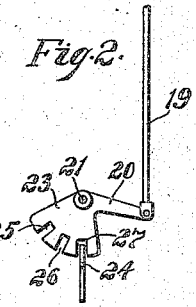
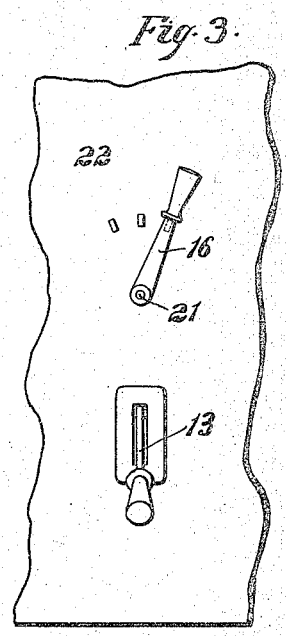

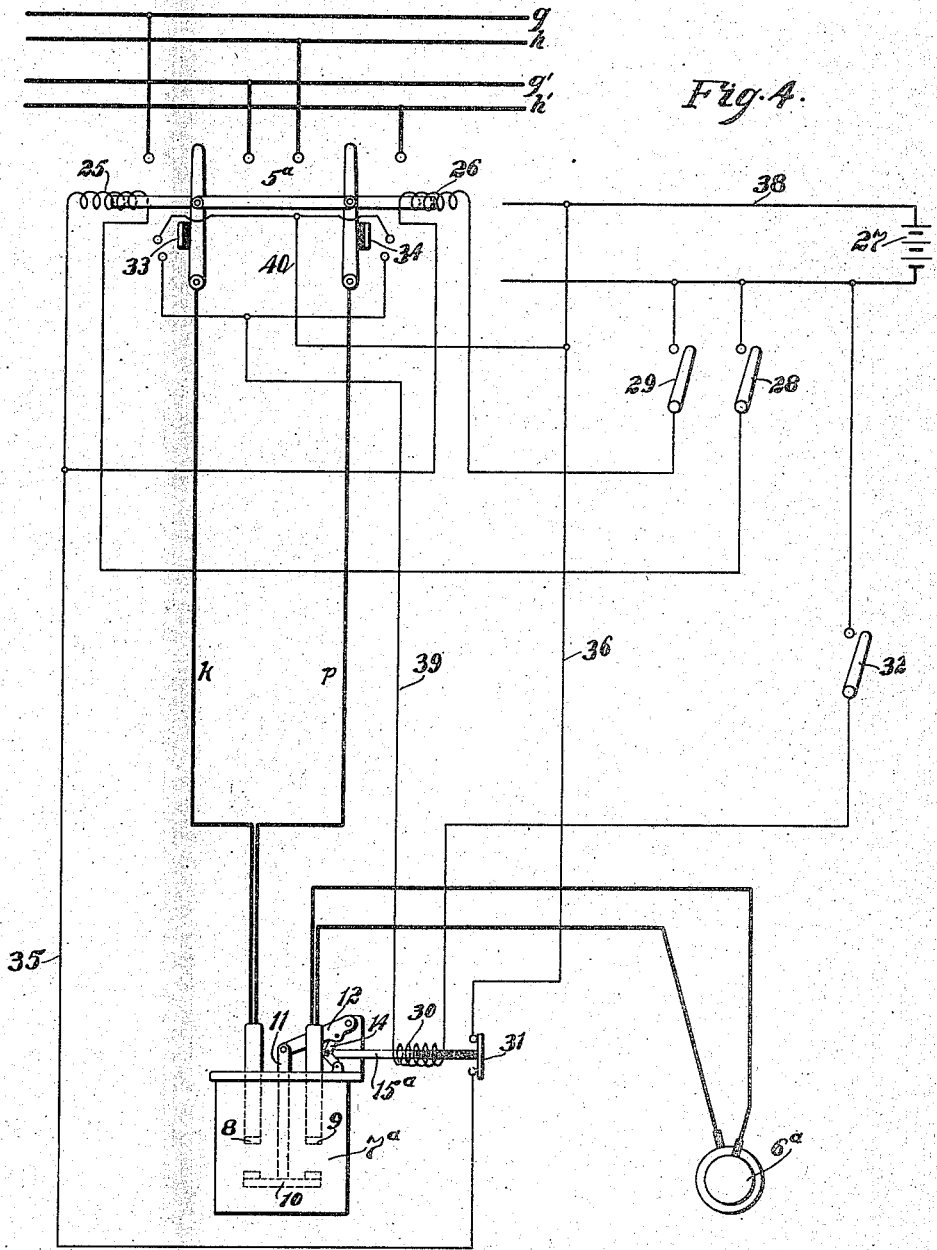

HERMON L. VAN VALKENBURG, OF NORWOOD, OHIO, ASSIGNOR TO THE BULLOCK ELECTRIC MANUFACTURING COMPANY, A CORPORATION OF OHIO.

SYSTEM OF DISTRIBUTION.

933,211.   Specification of Letters Patent.   Patented Sept. 7, 1909.

Application filed June 22, 1905. Serial No. 266,520.

*To all whom it may concern:*

Be it known that I, HERMON L. VAN VALKENBURG, a citizen of the United States, residing at Norwood, in the county of Hamilton and State of Ohio, have invented certain new and useful Improvements in Systems of Distribution, of which the following is a full, clear, and exact specification.

My invention relates to systems of electrical distribution and particularly to the controlling mechanism for such systems.

In systems of distribution for current at high potential as at present constructed and arranged, it is customary to employ a plurality of sets of distributing mains or duplicate sets of bus bars on the switch-boards of generating or sub-stations. In case one set of distributing mains or one set of bus bars becomes injured, or for any other reason it is found desirable to cut same out of service, the dynamo-electric machine, or other electrical apparatus normally connected to said set of mains, or bus bars, may readily be transferred to the other set of mains or bus bars without materially interfering with the continuous operation of the system. This is accomplished by means of transfer switches which are usually of light and relatively inexpensive construction and are not adapted to be employed for opening and closing the circuit of high potential mains while current is flowing in the circuit. For the purpose of controlling the supply of current in the circuit a specially constructed switch, such as an oil-switch, is employed. As it would be extremely dangerous under ordinary conditions to open the circuit by means of the transfer-switch when the oil-switch is closed, that is, while a heavy current at high voltage is flowing through the circuit, it is the object of my invention to prevent positively the operation of such transfer-switch unless the oil-switch is in its open position, and thereby permit the employment of a very simple and inexpensive form of transfer-switch with perfect safety.

The invention therefore consists of an oil-switch and transfer-switch such as employed in a high potential system of distribution, in combination with an interlock between said switches.

More specifically considered, the invention comprises the combination of duplicate sets of high potential mains, an electric translating device, such as a dynamo-electric machine, transformer, or the like, a transfer-switch for connecting said translating device to one or the other of said sets of mains, an oil-switch in the circuit between the translating device and the transfer-switch, electromagnetic operating means for said switches, and an electrical interlock between the operating electro-magnets so that the transfer-switch can not be operated unless the oil-switch is in its open position.

In the accompanying drawings, which illustrate the preferred embodiments of my invention, Figure 1 is a diagrammatic representation of an oil-switch and transfer-switch with a mechanical interlock between them; Fig. 2 is a detail of the interlocking mechanism; Fig. 3 is an elevation of part of the front of switch-board panel shown in Fig. 1; and Fig. 4 is a diagrammatic representation of a system of distribution provided with electrically operated transfer-switch and oil switch with an electrical interlock between them.

Referring first to the modification illustrated in Figs. 1, 2, and 3, the high potential mains or bus bars of a three-phase system of distribution are shown in duplicate sets, $a$, $b$, $c$, and $a'$, $b'$, and $c'$. One or the other of said sets of mains or bus bars is adapted to be connected to the mains $d$, $e$, and $f$ by means of the transfer switch 5. Located in the circuit of said mains $d$, $e$, and $f$, between said transfer-switch and the translating device 6 is the specially constructed circuit-breaking switch 7, here illustrated as an oil-switch. The oil-switch comprises the relatively fixed contacts 8 and 9, which are bridged by the bridging member 10 carried by the reciprocating rod 11 attached to lever 12. Said lever 12 is connected with the operating handle 13 by means of the toggle 14 and link 15. The oil-switch is shown in its closed position. The transfer-switch 5 is connected to its operating handle 16 through the connecting-rod 17, the bell crank lever 18, and the rod 19, the latter being connected to the arm 20 mounted upon the shaft 21, which extends completely through the switch-board panel 22 and carries said handle 16. To form an interlock between the transfer-switch and the oil-switch so as to prevent said transfer-switch from being operated unless the oil-switch is in its open position, I mount the slotted plate 23 upon the shaft 21, and provide the handle 13 with the projecting blade 24 which co-acts with the slots 25, 26, and 27 in said plate 23. The slots 25 and 27 correspond to the operative positions of the transfer-switch 5 and the slot 26 corresponds to its "off", or mid position. With the switches as shown in Fig. 1, the transfer switch 5 is connected to the mains *a, b, c,* and the oil-switch is closed. The projecting blade 24 has therefore been moved into the slot 27 on plate 23 (as shown in Figs. 1 and 2) and the switch 5 and handle 16 are locked against movement, thereby being prevented from being opened until the switch 7 is opened and the projecting blade 24 is moved out of engagement with slot 27.

In Fig. 4 I have illustrated diagrammatically the duplicate sets of single-phase mains or bus bars *g, h,* and *g′ h′,* adapted to be connected to the translating device 6ª through the connecting mains *k, p* by means of the transfer-switch 5ª and the oil-switch 7ª. The transfer-switch in this modification is provided with the operating electro-magnets 25 and 26, adapted to be operated by current from the auxiliary source of current supply 27. Said magnets are controlled from a distant point by the master controlling switches 28 and 29 respectively. The toggle 14 of the oil-switch 7ª is connected with the rod 15ª forming the core of the operating electro-magnet 30. This rod 15ª is also provided with an auxiliary switch 31 which is connected in circuit with the operating electro-magnets 25 and 26 to form an electric interlock which prevents the operation of transfer-switch 5ª unless the oil-switch is in its open position. The electro-magnet 30 is operated by current from the auxiliary source of current supply 27 and is controlled by the master controlling switch 32. Also connected in circuit with said electro-magnet 30 are the auxiliary switches 33 and 34 carried by the transfer-switch. These switches 33 and 34 prevent the oil-switch from being operated unless the transfer-switch is in one or the other of its operative positions. In the operation of this modified form of my invention illustrated in Fig. 4, with the oil-switch in its open position as shown, and the auxiliary switch 31 closed, it is possible to throw the transfer-switch into either of its operative positions. By closing the master switch 28, a circuit is completed from the source of supply 27, through switch 28, operating magnet 25, conductor 35, auxiliary switch 31, conductors 36 and 38 to 27. The completion of this circuit energizes the magnet 25 and the transfer-switch is thrown so as to connect the mains *g, h* to the connection mains *k* and *p.* To connect the mains *g′, h′* with connection mains *k* and *p,* the magnet 26 is energized by closing the master switch 29 and completing a circuit from the source of current supply 27, through switch 29, magnet 26, conductor 35, auxiliary switch 31, conductors 36 and 38 to source 27. With the transfer-switch 5ª in either of its operative positions so as to have one or the other of the interlock switches 33 and 34 closed, the oil-switch 7ª may be closed by energizing the magnet 30. This is accomplished by closing the master switch 32 so as to complete a circuit from the source of supply 27 through switch 32, magnet 30, conductor 39, either of switches 33 or 34, conductors 40 and 38 to source 27. As the oil-switch is closed the auxiliary interlock switch 31 is opened and the transfer-switch is prevented from operating so long as said oil-switch remains in its closed position. The auxiliary switch 31 closes and the oil-switch 7ª opens automatically when the magnet 30 is deënergized. It will thus be seen that with the arrangement just described a simple system of remote control for the oil-switch and transfer-switch is provided and neither of said switches can be operated unless the other is in a predetermined position.

I do not desire to be limited to the specific modifications herein illustrated and described, as I am aware that many modifications and changes may be made without departing from the spirit and scope of the invention.

Having thus described my invention, what I claim as new and desire to secure by Letters Patent is—

1. In a high potential system of distribution, an oil-switch, two conductors, a transfer-switch for connecting said oil-switch to either of said conductors, electro-magnetic means for operating each of said switches, and an interlock between said switches.

2. In a high potential system of distribution, an oil-switch, two conductors, a transfer-switch for connecting either of said conductors to said oil-switch, separate operating means for each of said switches, and means for preventing any operation of the transfer-switch unless the oil-switch is in its open position.

3. In a high potential system of distribution, an oil-switch, two conductors, a transfer-switch for connecting said oil-switch to either of said conductors, separate operating means for each of said switches, and means for preventing any operation of either of said switches unless the other switch is in a predetermined position.

4. In a high potential system of distribution, an oil-switch, two conductors, a transfer-switch for connecting said oil-switch to either of said conductors, remote control mechanism for said switches, and means for preventing any operation of either of said switches unless the other switch is in a predetermined position.

5. In a high potential system of distribution, an oil-switch, two conductors, a transfer-switch for connecting either of said conductors to said oil-switch, means for operating said switches, means for controlling said operating means, and an interlock which prevents any operation of said transfer-switch unless the oil-switch is in its open position.

6. In a high potential system of distribution, an oil-switch, two conductors, a transfer-switch for connecting either of said conductors to said oil-switch, electro-magnets for operating said switches, master controlling switches for said electro-magnets, and auxiliary switches in circuit with said electromagnets and controlled by said oil-switch and transfer-switch to form an electrical interlock between said operating electro-magnets.

7. In a high potential system of distribution, an electro-magnetically operated oil-switch, two conductors, an electro-magnetically operated transfer-switch for connecting either of said conductors to said oil-switch, and an electrical interlock between said switches so as to prevent the operation of the transfer-switch when the oil-switch is in its closed position.

8. In a high potential system of distribution, an oil-switch, two conductors, a transfer-switch for connecting said oil-switch to either of said conductors, electro-magnets for operating said switches, master controlling switches for said electro-magnets, and connections whereby the oil-switch and the transfer-switch each control the circuit of the operating magnet or magnets of the other switch.

9. In combination, duplicate sets of high potential mains, an electrical translating device, a transfer-switch for connecting said translating device to one or the other of said sets of mains, an oil-switch in the circuit between the translating device and said transfer-switch, electromagnetic operating means for each of said switches, and an interlock between said oil-switch and said transfer-switch.

10. In combination, duplicate sets of high potential mains, an electrical translating device, a transfer-switch for connecting said translating device to one or the other of said sets of mains, an oil-switch in the circuit between the translating device and said transfer-switch, means for controlling the operation of said switches from a distant point, and an electrical interlock between said switches to prevent the opening of the circuit by means of the transfer-switch.

11. In combination, duplicate sets of high potential mains, an electrical translating device, a transfer-switch for connecting said translating device to one or the other of said sets of mains, an oil-switch in the circuit between the translating device and said transfer-switch, electro-magnetic operating means for said switches, and an electrical interlock between said operating electro-magnets so that the transfer-switch can not be operated unless the oil-switch is in its open position.

12. In combination, a plurality of sets of bus-bars, a dynamo-electric machine, a transfer-switch for connecting said machine to either set of bus bars, an oil-switch in circuit with said machine, separate operating means for said two switches, and means for preventing any operation of the transfer-switch unless the oil-switch is in its open position.

13. In a system of distribution, a plurality of mains, a translating device, leads for said translating device, a switch in said leads, a transfer switch for connecting said leads to different sets of said mains, and an electrical interlock between said switches.

14. In a system of distribution, a plurality of mains, a translating device, leads for said translating device, a transfer switch for connecting said leads to any set of the mains, a switch for completing the circuit of said translating device, and an electrical interlock between said switches.

15. In a system of distribution, a plurality of mains, a translating device, leads for said translating device, a switch in said leads, a transfer switch for connecting said leads to different sets of said mains, separate operating means for said two switches, and an interlock between said switches to prevent any operation of the transfer switch when the other switch is closed.

16. In a system of distribution, a plurality of mains, a translating device, leads for said translating device, an electromagnetically operated transfer switch for connecting said leads to any set of the mains, a switch for completing the circuit of said translating device, and means for preventing the opening of the transfer switch when the circuit-completing switch is closed.

17. In a system of distribution, a plurality of mains, a translating device, leads for said translating device, a transfer switch for connecting said leads to any set of the mains, an electromagnetically operated oil switch for completing the circuit of said translating device, and an interlock between said switches.

18. In a system of distribution, a plurality of mains, a translating device, leads for said translating device, a switch in said leads, a transfer switch for connecting said leads to different sets of said mains, separate operating means for said two switches, and means for preventing any operation of either of said switches when the other switch is in a predetermined position.

19. In a system of distribution, a plurality of mains, a translating device, leads for said translating device, an electromagnetically operated transfer switch for connecting said leads to any set of the mains, an electromagnetically operated switch for completing the circuit of said translating device, and remote control mechanism for said switches.

20. In a system of distribution, a plurality of mains, a translating device, leads for said translating device, a transfer switch for connecting said leads to any set of the mains, a switch for completing the circuit of said translating device, remote control mechanism for said switches, and means for preventing any operation of either of said switches unless the other switch is in a predetermined position.

21. In a system of distribution, a plurality of mains, a translating device, leads for said translating device, an electromagnetically operated switch in said leads, an electromagnetically operated transfer switch for connecting said leads to different sets of said mains, and connections between the switches so as to prevent the operation of the transfer switch when the other switch is closed.

22. In a high potential system of distribution, an oil-switch, two conductors, a transfer-switch for connecting said oil-switch to either of said conductors, means for operating each of said switches, and an electrical interlock between said switches.

23. In a system of distribution, a plurality of mains, a translating device, leads for said translating device, a transfer switch for connecting said leads to any set of the mains, a switch for completing the circuit of said translating device, and means for preventing the closing of the circuit-completing switch unless the transfer switch is closed.

24. In a system of distribution, a plurality of mains, a translating device, leads for said translating device, a transfer switch for connecting said leads to any set of the mains, a switch for completing the circuit of said translating device, and means for preventing the operation of the circuit-completing switch when the transfer switch is open.

25. In a system of distribution, a translating device, a switch for making and breaking the circuit of said device, two sets of conductors, a transfer switch for connecting said first mentioned switch to either set of said conductors, power-operated means for actuating each of said switches, and means for preventing any operation of either of said switches unless the other switch is in a predetermined position.

26. In a high potential system of distribution, an oil switch, two conductors, a transfer switch for connecting either of said conductors to said oil switch, power-operated actuating means for each of said switches, and means for preventing the application of power to the actuating means of either of said switches unless the other switch is in a predetermined position.

In testimony whereof I affix my signature, in the presence of two witnesses.

HERMON L. VAN VALKENBURG.

Witnesses:
L. LOWENBERG,
FRED J. KINSEY.